United States Patent
Ronning et al.

(10) Patent No.: US 9,960,463 B2
(45) Date of Patent: May 1, 2018

(54) CLOSE-COUPLED DRY BATTERY SYSTEM FOR HYBRID AND ELECTRIC VEHICLES

(75) Inventors: Jeffrey J. Ronning, Noblesville, IN (US); Dennie E. Emerson, Fishers, IN (US); Laura M. Soverns, Pendleton, IN (US); Christopher A. Bledsoe, Anderson, IN (US)

(73) Assignee: Flagship Enterprise Center, Inc., Anderson, IN (US)

( * ) Notice: Subject to any disclaimer, the term of this patent is extended or adjusted under 35 U.S.C. 154(b) by 330 days.

(21) Appl. No.: 14/115,010

(22) PCT Filed: May 1, 2012

(86) PCT No.: PCT/US2012/035958
§ 371 (c)(1),
(2), (4) Date: Jan. 7, 2014

(87) PCT Pub. No.: WO2012/151190
PCT Pub. Date: Nov. 8, 2012

(65) Prior Publication Data
US 2014/0141300 A1    May 22, 2014

Related U.S. Application Data

(60) Provisional application No. 61/482,908, filed on May 5, 2011.

(51) Int. Cl.
*H01M 10/625* (2014.01)
*H01M 10/613* (2014.01)
(Continued)

(52) U.S. Cl.
CPC ..... *H01M 10/5016* (2013.01); *H01M 2/1077* (2013.01); *H01M 10/613* (2015.04);
(Continued)

(58) Field of Classification Search
CPC ......... H01M 10/0525; H01M 10/5004; H01M 10/5016; H01M 10/613; H01M 10/625;
(Continued)

(56) References Cited

U.S. PATENT DOCUMENTS 7,399,548 B2   7/2008   Okazaki et al.
7,611,786 B2   11/2009  Hatoh et al.
(Continued)

OTHER PUBLICATIONS

PCT Search Report and Written Opinion for PCT/US2012/035958, completed Nov. 15, 2012.

*Primary Examiner* — Lingwen R Zeng
(74) *Attorney, Agent, or Firm* — Barnes & Thornburg LLP

(57) ABSTRACT

A battery pack apparatus comprising a first cell bank and a laminated cooling plate. The first cell bank includes a first tray and at least one battery cell coupled to the tray. The laminated cooling plate being in contact with the first cell bank and including a plurality of face sheets and a plurality of internal sheets. The face sheets forming a fluid inlet and a fluid outlet. The plurality of internal sheets forming a plurality of fluid passages connecting the fluid inlet to the fluid outlet. The internal sheets further formed to include fluid pathways defining the fluid passages wherein none of the fluid pathways individually defining an uninterrupted flow path.

23 Claims, 7 Drawing Sheets

(51) Int. Cl.
*H01M 2/10* (2006.01)
*H01M 10/647* (2014.01)
*H01M 10/6557* (2014.01)
*H01M 10/0525* (2010.01)

(52) U.S. Cl.
CPC ....... *H01M 10/625* (2015.04); *H01M 10/647* (2015.04); *H01M 10/6557* (2015.04); *H01M 10/0525* (2013.01); *Y02E 60/122* (2013.01)

(58) Field of Classification Search
CPC .......... H01M 10/647; H01M 10/6557; H01M 2/1077; Y02T 10/7011; Y02E 60/122
See application file for complete search history.

(56) References Cited

U.S. PATENT DOCUMENTS

| | | | |
|---|---|---|---|
| 2002/0195238 A1 | 12/2002 | Takigawa et al. | |
| 2004/0142238 A1* | 7/2004 | Asahina | B60L 3/0046 429/176 |
| 2006/0219396 A1 | 10/2006 | Abel et al. | |
| 2008/0090137 A1* | 4/2008 | Buck | H01M 2/1077 429/120 |
| 2010/0143782 A1 | 6/2010 | Kruger et al. | |
| 2011/0300428 A1* | 12/2011 | Sohn | H01M 2/1066 429/120 |
| 2012/0055725 A1* | 3/2012 | Mizoguchi | H01M 10/613 180/68.5 |

* cited by examiner

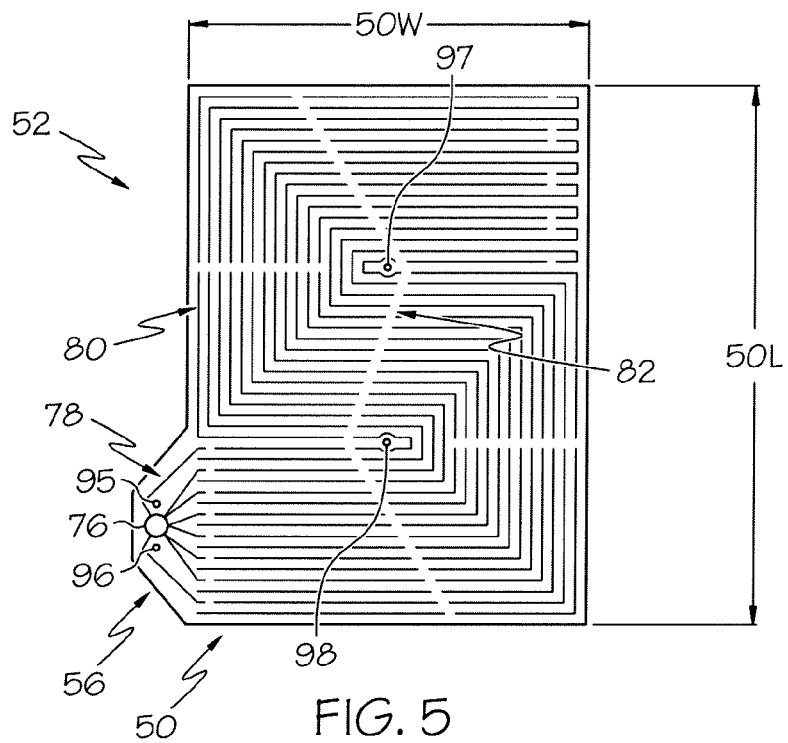
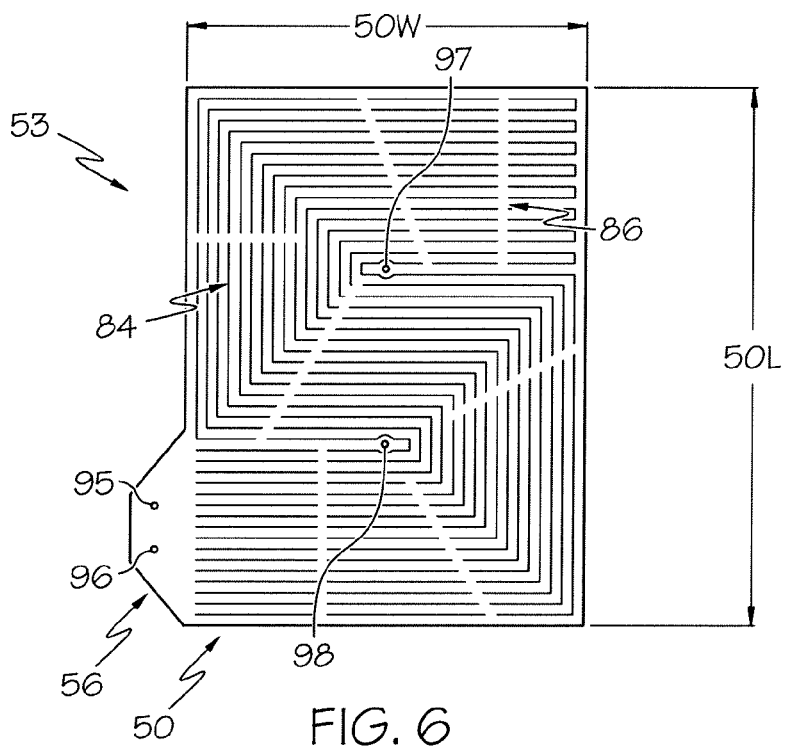

CLOSE-COUPLED DRY BATTERY SYSTEM FOR HYBRID AND ELECTRIC VEHICLES

CROSS-REFERENCE TO RELATED APPLICATIONS

This application is a national stage entry under 35 USC § 371(b) of International Application No. PCT/US2012/035958, filed May 1, 2012, which claims priority to U.S. Provisional Application Ser. No. 61/482,908 filed May 5, 2011, the disclosures of which are incorporated herein by reference in their entirety.

BACKGROUND

The present disclosure relates to battery packs for automotive vehicles. More particularly, the present disclosure relates to battery cooling apparatus using a fluid state medium to cool battery packs having at least one stacked array of rechargeable battery cells.

Electric vehicles, including hybrid electric vehicles, have electric motors for propelling the vehicles along roadways, for example, and these electric motors typically rely upon onboard rechargeable batteries as their energy source. Battery packs having a fairly large number of individual rechargeable battery cells are frequently used with such vehicles. An example of a battery cell that is used in electric vehicles is a lithium ion battery cell. When recharging and when discharging to provide power to the electric motors of electric vehicles, the battery cells generate heat that needs to be removed in order to maintain the battery cells below their maximum allowable temperatures so that the battery cells are not damaged or destroyed by the heat. When removing heat from battery packs, it is desirable but not necessary to have the faces of each of the battery cells maintained at a fairly uniform temperature.

It is known in the art that liquid-cooling provides significant convection coefficients and can be used to cool battery packs. However, some of these systems include dozens or hundreds of liquid-sealed connections. This proliferation of connections may add cost and risk of leakage to the liquid coolers for use with battery packs. Accordingly, there is a need for an improved liquid cooled battery pack apparatus.

SUMMARY

A battery pack apparatus for an automotive vehicle is provided and comprises one or more of the features recited in the appended claims and/or the following features which, alone or in any combination, may comprise patentable subject matter:

A laminate cooling plate having a top surface and a bottom surface may include a fluid inlet, a fluid outlet, and a plurality of internal sheets. The internal sheets may form a plurality of fluid passages between the top surface and the bottom surface. Each of the plurality of fluid passages may form an S-shaped circuit that connects the fluid inlet to the fluid outlet. The internal sheets may be formed to include fluid pathways cooperating to define the fluid passages.

In some embodiments, some of the fluid pathways may individually define an uninterrupted flow path. Each of the plurality of fluid passages may independently connect the fluid inlet to the fluid outlet.

In some embodiments, the plurality of fluid passages may interdigitally couple to the fluid inlet and the fluid outlet. The fluid inlet and the fluid outlet may be aligned so that the fluid outlet lies in a footprint of the fluid inlet when viewing the top surface of the laminate cooling plate. It is contemplated that the plurality of passages may be substantially the same length and each of the plurality of passages may have an equal number of turns.

In some embodiments, each of the plurality of internal sheets may be formed to include a plurality of pathways. The plurality of pathways of each of the plurality of internal sheets may cooperate with the plurality of pathways of the other internal sheets to define the plurality of passageways.

A battery pack apparatus may include a first cell bank and a laminated cooling plate. The first cell bank may include a first tray and at least one battery cell coupled to the tray. The laminated cooling plate may be in contact with the first cell bank and may include a plurality of face sheets forming a fluid inlet and a fluid outlet and a plurality of internal sheets forming a plurality of fluid passages connecting the fluid inlet to the fluid outlet. The internal sheets may be formed to include fluid pathways defining the fluid passages wherein none of the fluid pathways individually defining an uninterrupted flow path.

In some embodiments, the fluid passages may provide an independent flow path between the fluid inlet and the fluid outlet. The plurality of face sheets may include a top face sheet formed to include an external inlet hole and a bottom face sheet formed to include an external outlet hole. It is contemplated that a substantially similar pressure drop may be produced along each of the plurality of fluid passages.

The plurality of internal sheets may include a first internal sheet formed to include an internal inlet hole and a first plurality of fluid pathways extending through the first internal sheet. The plurality of internal sheets may include a second internal sheet formed to include a second plurality of fluid pathways extending through the second internal sheet. The plurality of internal sheets may include a third internal sheet formed to include an internal outlet hole and a third plurality of fluid pathways extending through the third internal sheet.

A pattern of the second plurality of fluid pathways may be substantially similar to a pattern of the first plurality of internal pathways. The second internal sheet may be indexed with respect to the first internal sheet so that the second plurality of fluid pathways is aligned with the first plurality of fluid pathways.

The first internal sheet may include a first interruption blocking the first plurality of fluid pathways at a point. The second internal sheet may include a second interruption blocking the second plurality of fluid pathways at a point. The third internal sheet may include a third interruption blocking the third plurality of fluid pathways at a point. It is contemplated that the first interruption, the second interruption, and the third interruption may be spaced apart from one another.

A battery pack apparatus may include a first cell bank and a laminated cooling plate. The first cell bank may include a first tray and at least one battery cell. The laminated cooling plate may be in contact with the first cell bank and may include a plurality of sheets. Each sheet may be formed to include cutouts forming a flow path through the laminated cooling plate. Each of the cutouts may extend through the thickness of a sheet.

The laminated cooling plate may include a fluid inlet, a fluid outlet, and a plurality of fluid flow passages connecting the fluid inlet and the fluid outlet. Each of the plurality of fluid flow passages may provide an independent flow path between the fluid inlet and the fluid outlet.

The plurality of internal sheets may include a first internal sheet formed to include an internal inlet hole and a first plurality of fluid pathways extending through the first internal sheet. The plurality of internal sheets may include a second internal sheet formed to include a second plurality of fluid pathways extending through the second internal sheet. The plurality of internal sheets may include a third internal sheet formed to include an internal outlet hole and a third plurality of fluid pathways extending through the third internal sheet.

The first internal sheet, the second internal sheet, and the third internal sheet may be indexed relative to one another and brazed together so that the first plurality of pathways, the second plurality of pathways, and the third plurality of pathways cooperate to define the plurality of fluid flow passageways connecting the fluid flow inlet and the fluid flow outlet.

Additional features, which alone or in combination with any other feature(s), such as those listed above and those listed in the appended claims, may comprise patentable subject matter and will become apparent to those skilled in the art upon consideration of the following detailed description of illustrative embodiments exemplifying the best mode of carrying out the embodiments as presently perceived.

BRIEF DESCRIPTION OF THE DRAWINGS

The detailed description particularly refers to the accompanying figures, in which:

FIG. 5 is a top plan view of a first interior sheet included in the laminate cooling plate of FIG. 3 showing that an interior inlet hole, a plurality small fastener holes, and a first plurality of pathways are formed through the first interior sheet and showing that each of the first plurality of pathways are blocked by a first series of interruptions;

FIG. 6 is a top plan view of a second interior sheet included in the laminate cooling plate of FIG. 3 showing a plurality small fastener holes and a second plurality of pathways formed through the second interior sheet with a pattern substantially similar to the first plurality of pathways formed in the first interior sheet of FIG. 5 and showing that each of the second plurality of pathways are blocked by a second series of interruptions that do not align with the first series of interruptions included in the first interior sheet shown in FIG. 5;

DETAILED DESCRIPTION

Figure 1:
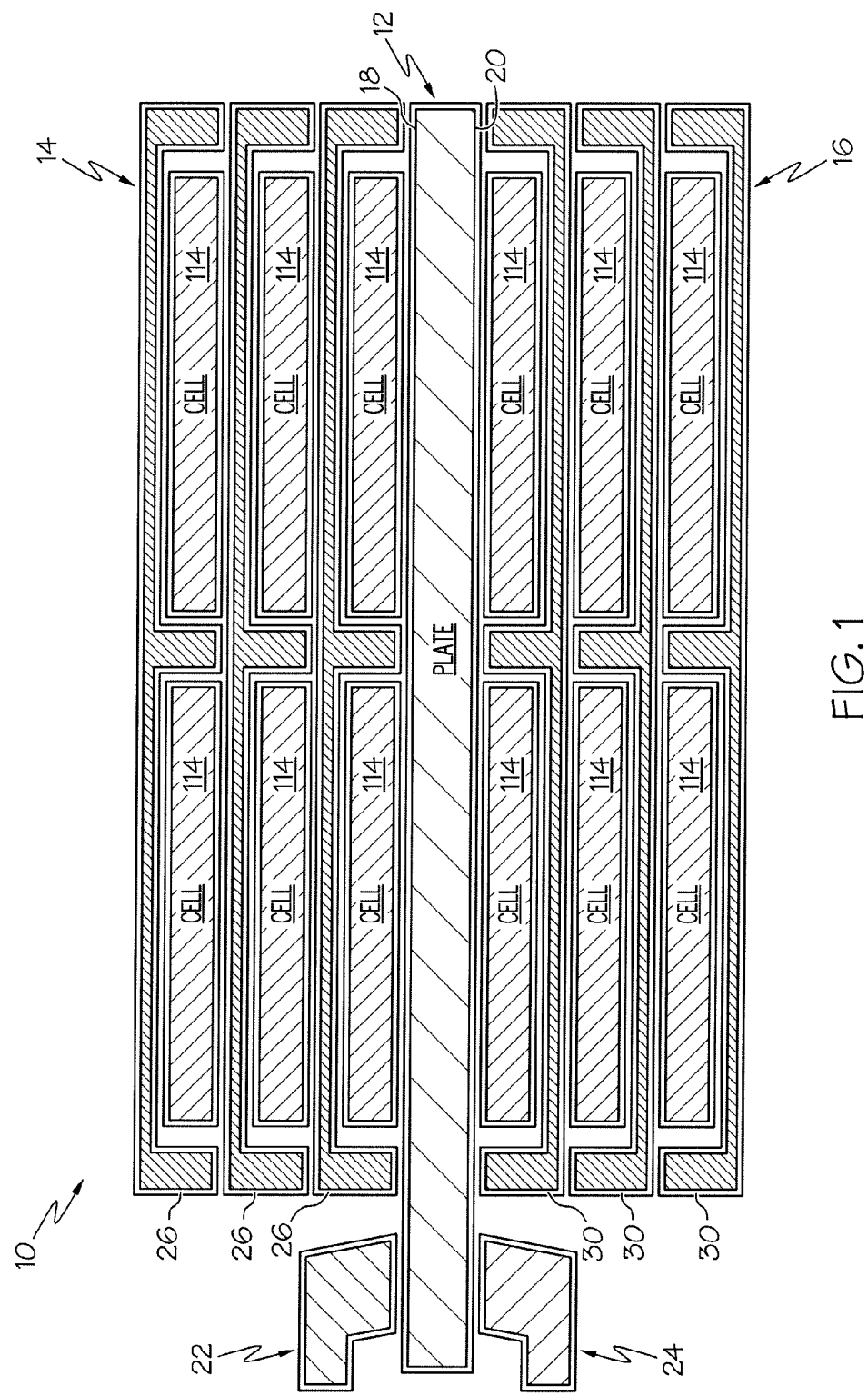
FIG. 1 is a cross sectional diagrammatic view of a battery pack including a top cell bank, a bottom cell bank, and a cooling plate situated between the top cell bank and the bottom cell bank and showing that a top surface of the cooling plate contacts both a battery cell and a thermally conductive tray included in the top cell bank and a bottom surface of the cooling plate contacts both a battery cell and a thermally conductive tray included in the bottom cell bank to remove heat generated by the top and the bottom cell banks.

An illustrative battery pack apparatus 10 includes laminate cooling plate 12, a top cell bank 14, and a bottom cell bank 16 as shown in FIG. 1. Cooling plate 12 has a top surface 18 and a bottom surface 20. Top cell bank 14 is coupled to top surface 18 of cooling plate 12 so that heat generated by top cell bank 14 may be transferred to cooling plate 12. Bottom cell bank 16 is coupled to bottom surface 20 of cooling plate 12 so that cooling plate 12 so that heat generated by bottom cell bank 16 may be transferred to cooling plate 12.

Cooling plate 12 is coupled to a fluid inlet coupling 22 and a fluid outlet coupling 24 so that a liquid cooling medium can be passed through cooling plate 12 to remove heat from cooling plate 12. Cooling plate 12 is configured so that a cool fluid medium enters cooling plate 12 through fluid inlet coupling 22 and the fluid medium flows through cooling plate 12 and exits cooling plate 12 after absorbing heat from cooling plate 12 through fluid outlet coupling 24. In the illustrative embodiment, a thin layer of thermal gel or another interface compound may be spread at the interface of the cooling plate 12 with the top cell bank 14 and the bottom cell bank 16 to reduce air gaps that could provide thermal barriers between the cooling plate and the cell banks 14, 16.

Figure 2:
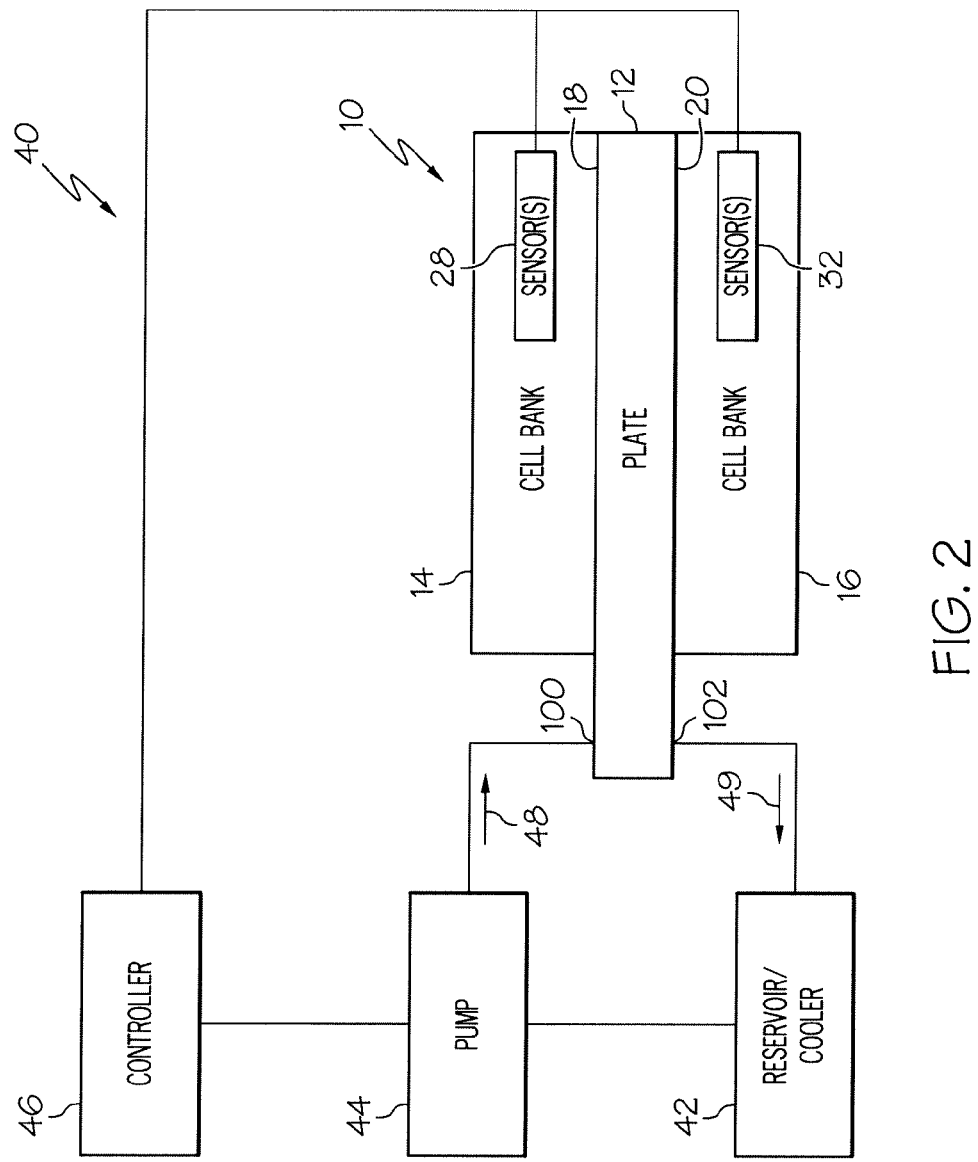
FIG. 2 is a diagrammatic view of a fluid cooling system including the battery pack of FIG. 1 showing the cooling plate fluidly coupled to a pump and a fluid reservoir and suggesting that a fluid medium can be pumped through the cooling plate to remove heat from the top and bottom cell banks.

Top cell bank 14 illustratively includes a plurality of cell blocks 26 and at least one sensor 28 as shown in FIGS. 1 and 2. Cell blocks 26 produce heat when battery pack apparatus 10 is electrically charged or loaded. At least one sensor 28 is illustratively configured to measure the temperature of each cell block 26.

Bottom cell bank 16 illustratively includes a plurality of cell blocks 30 and at least one sensor 32 as shown in FIGS. 1 and 2. Cell blocks 30 produce heat when battery pack apparatus 10 is electrically charged or loaded. At least one sensor 32 is illustratively configured to measure the temperature of each cell block 26.

Battery pack apparatus 10 is configured for use in a cooling system 40 as shown diagrammatically in FIG. 2. Cooling system 40 includes a fluid medium reservoir 42, a pump 44, and a controller 46. Reservoir 42 holds a fluid medium to be pumped through cooling plate 12. In some embodiments, reservoir 42 is also a cooler that actively or passively cools the fluid medium stored therein. Pump 44 is configured to pump fluid medium from reservoir 42 through cooling plate 12 and back into reservoir 42 as suggested by arrows 48, 49 shown in FIG. 2.

Controller 46 is coupled to temperature sensors 28, 32 included in cell banks 14, 16 to receive information about the temperature of cell banks 14, 16 over time as shown in FIG. 2. Controller 46 is also coupled to pump 44 so that controller 46 directs pump 44. Controller 46 directs pump 44 to increase or decrease the flow rate of fluid medium through cooling plate 12 in response to information received from sensors 28, 32 so that the rate of heat transfer through cooling plate 12 maintains cell banks 14, 16 in a predetermined range.

Figure 3:
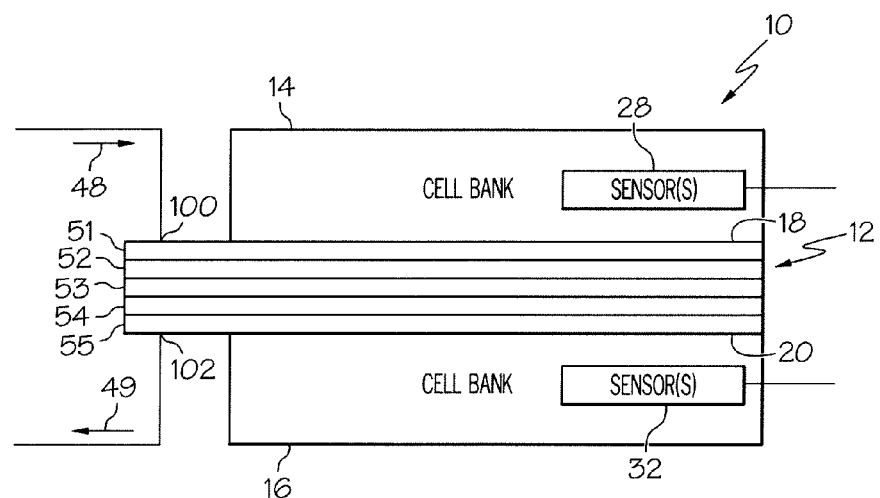
FIG. 3 is a detailed diagrammatic view of the battery pack of FIG. 2 showing that the cooling plate is a laminate cooling plate including a plurality of sheets fused together to provide a substantially leak-proof plate.
Figure 4:
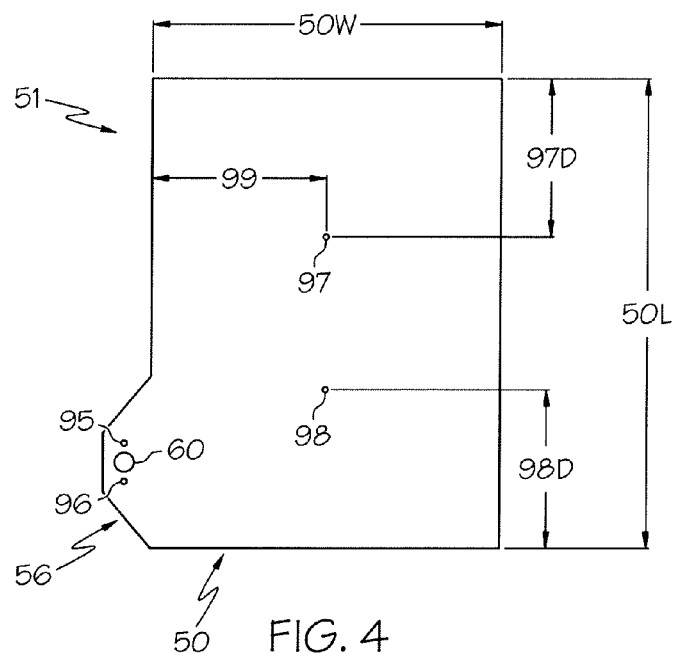
FIG. 4 is a top plan view of a top face sheet included in the laminate cooling plate shown diagrammatically in FIG. 3 showing an external inlet hole and a plurality small fastener holes formed in the top face sheet.

Cooling plate 12 is a laminate plate including a plurality of sheets 51, 52, 53, 54, 55 stacked together and fused to produce a single substantially leak-proof plate as shown diagrammatically in FIG. 3. In the illustrative embodiment, sheets 51, 52, 53, 54, 55 each have a thickness of about 4 mm so that cooling plate 12 has a combined thickness of about 20 mm. Additionally, each sheet 51, 52, 53, 54, 55 includes a platform 50 and a connection ear 56 as shown in FIGS. 4-8. Platform 50 has a width 50W, illustratively about 360 mm, and a length 50L, illustratively 510 mm, as shown, for example, in FIG. 4.

Cooling plate 12 illustratively includes top face sheet 51, first internal sheet 52, second internal sheet 53, third internal sheet 54, and bottom face sheet 55 as shown in FIGS. 4-8. Top face sheet 51 is formed to include an external inlet hole 60 extending through connection ear 56 of top face sheet 51 and configured to couple to fluid inlet coupling 22. Additionally, platform 50 of top face sheet 51 is substantially smooth and flat so that a continuous thermal connection can be maintained between top cell bank 14 and top face sheet 51 of cooling plate 12 as suggested in FIGS. 1-3.

First internal sheet 52 is formed to include an internal inlet hole 76, a plurality of feeder slots 78, and a plurality of pathways 80 that each extend through the entire thickness of first internal sheet 52 as shown in FIG. 5. Feeder slots 78 are illustratively about 6 mm wide. Internal inlet hole 76 and feeder slots 78 extend through connection ear 56 of first internal sheet 52. Internal inlet hole 76 is aligned with external inlet hole 60 as suggested by FIGS. 4 and 5.

Plurality of pathways 80 are formed through platform 50 of first internal sheet 52 and each of the plurality of pathways form an S-shape that doubles back on itself as shown in FIG. 5 so that a substantially uniform temperature can be maintained throughout cooling plate 12. Plurality of pathways 80 of first internal sheet 52 illustratively includes eight individual pathways each coupled at a first end to internal inlet hole 76 by one of the plurality of feeder slots 78 as shown in FIG. 5.

Plurality of pathways 80 of first internal sheet 52 are interrupted by a series of interruptions 82 included in first internal sheet 52 as shown in FIG. 5. Series of interruptions 82 provide structural support for first internal sheet 52 prior to fusing of sheets 51, 52, 53, 54, 55 to form cooling plate 12.

Second internal sheet 53 is formed to include a plurality of pathways 84 that each extend through the entire thickness of second internal sheet 54 as shown in FIG. 6. Plurality of pathways 84 of second internal sheet 53 are formed through platform 50 of second internal sheet 53 and each of the plurality of pathways form an S-shape that doubles back on itself as shown in FIG. 6 so that a substantially uniform temperature can be maintained throughout cooling plate 12. Plurality of pathways 84 of second internal sheet 53 illustratively includes eight individual pathways aligned with the plurality of pathways 80 of first internal sheet 52 as suggested by FIGS. 5 and 6.

Plurality of pathways 84 of second internal sheet 53 are interrupted by a series of interruptions 86 included in second internal sheet 53 as shown in FIG. 6. Series of interruptions 86 provide structural support for second internal sheet 53 prior to fusing of sheets 51, 52, 53, 54, 55 to form cooling plate 12. Further, series of interruptions 86 of second internal sheet 53 are spaced apart from and form a pattern different than series of interruptions 82 of first internal sheet 52 so that they do not align when sheets 51, 52, 53, 54, 55 are fused to form cooling plate 12.

Figure 7:
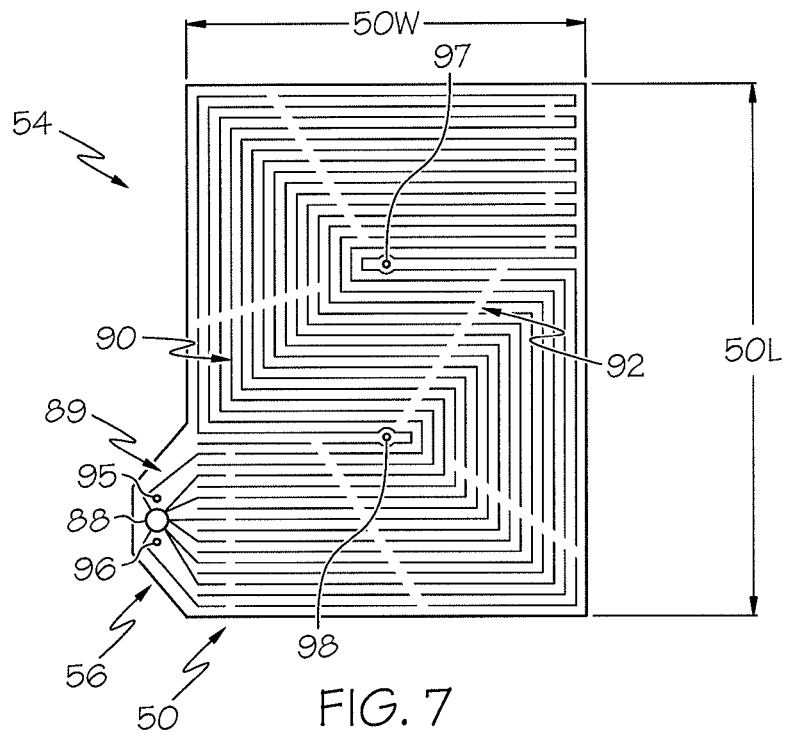
FIG. 7 is a top plan view of a third interior sheet included in the laminate cooling plate of FIG. 3 showing that an interior outlet hole, a plurality small fastener holes, and a third plurality of pathways are formed through the third interior sheet, the third plurality of pathways having a pattern substantially similar to the first and the second plurality of pathways formed in the first and the second interior sheets of FIGS. 5 and 6, and showing that each of the third plurality of pathways are blocked by a third series of interruptions that do not align with the first or the second series of interruptions included in the first and the second interior sheets shown in FIGS. 5 and 6.
Figure 8:
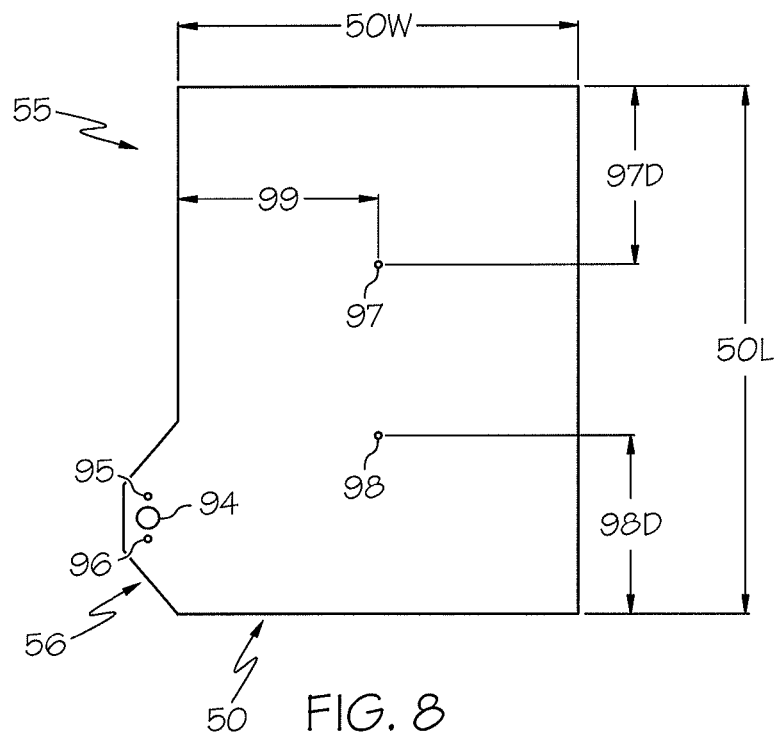
FIG. 8 is a top plan view of a bottom face sheet included in the laminate cooling plate shown diagrammatically in FIG. 3 showing an exterior outlet hole and a plurality small fastener holes formed in the bottom face sheet.

Third internal sheet 54 is formed to include an internal outlet hole 88, a plurality of feeder slots 89, and a plurality of pathways 90 that each extend through the entire thickness of third internal sheet 54 as shown in FIG. 7. Feeder slots 89 are illustratively about 6 mm wide. Internal outlet hole 88 and feeder slots 89 extend through connection ear 56 of third internal sheet 54.

Plurality of pathways 90 are formed through platform 50 of third internal sheet 54 and each of the plurality of pathways form an S-shape that doubles back on itself as shown in FIG. 7 so that a substantially uniform temperature can be maintained throughout cooling plate 12. Plurality of pathways 90 of third internal sheet 54 illustratively includes eight individual pathways aligned with the plurality of pathways 80 of first internal sheet 52 and plurality of pathways 84 of second internal sheet 53 as suggested by FIGS. 5-7. Each of the plurality of pathways 90 included in third internal sheet 54 are coupled at a second end to internal outlet hole 88 by one of the plurality of feeder slots 89 as shown in FIG. 7.

Plurality of pathways 90 of third internal sheet 54 are interrupted by a series of interruptions 92 included in third internal sheet 54 as shown in FIG. 7. Series of interruptions 92 provide structural support for third internal sheet 54 prior to fusing of sheets 51, 52, 53, 54, 55 to form cooling plate 12. Further, series of interruptions 92 of third internal sheet 54 are spaced apart from and form a pattern different than series of interruptions 82 of first internal sheet 52 and series of interruptions 86 of second internal sheet 53 so that they do not align when sheets 51, 52, 53, 54, 55 are fused to form cooling plate 12.

Bottom face sheet 55 is formed to include an external outlet hole 94 extending through connection ear 56 of bottom face sheet 55 and configured to couple to fluid outlet coupling 24. External outlet hole 94 is aligned with internal outlet hole 88 of third internal sheet 54 as suggested by FIGS. 7 and 8. Additionally, platform 50 of bottom face sheet 55 is substantially smooth and flat so that a continuous thermal connection can be maintained between bottom cell bank 16 and bottom face sheet 55 of cooling plate 12 as suggested in FIGS. 1-3.

Each pathway included in the plurality of pathways 80, 84, 90 of sheets 52, 53, 54, 55 are illustratively about 2 mm wide and are formed by one of a water jet or a laser. The center of each cut forming the pathways of the illustrative embodiment is about 10 mm from the centerline of an adjacent cut leaving about 8 mm of sheet material between each cut forming a pathway. Additionally, in the illustrative embodiment, each of the pathways 80, 84, 90 are the same length. Turns in the pathways are each illustratively about ninety-degrees with about a 5 mm radius. In other embodiments, other tools or methods, such as extrusion, may be used to form pathways of alternate dimensions.

Each sheet of plurality of sheets 51, 52, 53, 54, 55 are formed to include a plurality of fastener holes 95, 96, 97, 98 as shown in FIGS. 4-8. Fastener holes 95, 96 extend through connection ears 56 of sheets 51, 52, 53, 54, 55. Fastener holes 97, 98 extend through platform 50 of sheets 51, 52, 53, 54, 55 and are configured to receive fasteners (not shown) for coupling cell banks 14, 16 to cooling plate 12. Fastener holes 97, 98 are located about midway along the width 50W of platform 50 as indicated by distance 99, illustratively about 180 mm, in FIGS. 4 and 8. Fastener hole 97 and fastener hole 98 are each spaced approximately one-third of length 50L from opposing ends of platform 50 along the length 50L of platform 50 as indicated by distances 97D and 98D in FIGS. 4 and 8.

To fuse the plurality of sheets 51, 52, 53, 54, 55, the sheets are stacked as indicated diagrammatically in FIG. 3 and indexed so that the plurality of pathways 80, 84, 90 of internal sheets 52, 53, 54 are aligned. Then the stacked sheets 51, 52, 53, 54, 55 are brazed so that the contacting portions of the sheet melt together forming cooling plate 12 with an inlet 100, an outlet 102, and a plurality of fluid passageways 106 defined by the plurality of pathways 80, 84, 90 of internal sheets 52, 53, 54. Sheets 51, 52, 53, 54, 55 are illustratively constructed of braze alloy aluminum sheet material. In other embodiments, other thermally conductive metals or other materials are used. The aluminum sheets 51, 52, 53, 54, 55 are anodized with a thin coating after brazing to provide electrical isolation while maintaining overall heat transfer.

Inlet 100 is formed from external inlet hole 60 and internal inlet hole 76 as suggested in FIGS. 2 and 3. Inlet 100 is coupled to a first end of each of the internal passageways 106 by feeder slots 78. Outlet 102 is formed from external outlet hole 94 and internal outlet hole 88 as suggested in FIGS. 2 and 3. Outlet 102 is coupled to a second end of each of the internal passageways by feeder slots 89 so that the plurality of passageways 106 is interdigitally coupled to the inlet 100 and the outlet 102. Each of the plurality of fluid passageways provides an independent flow path from the inlet 100 to the outlet 102 as suggested by FIGS. 5 and 7.

Top cell bank 14 includes plurality of cell blocks 26 as shown in FIG. 1. Bottom cell bank 16 includes plurality of cell blocks 30 as shown in FIG. 1. Each cell block included in top cell bank 14 and bottom cell bank 16 are substantially similar and thus an exemplary cell block 110 is shown in FIG. 9 and described illustratively herein.

Figure 9:
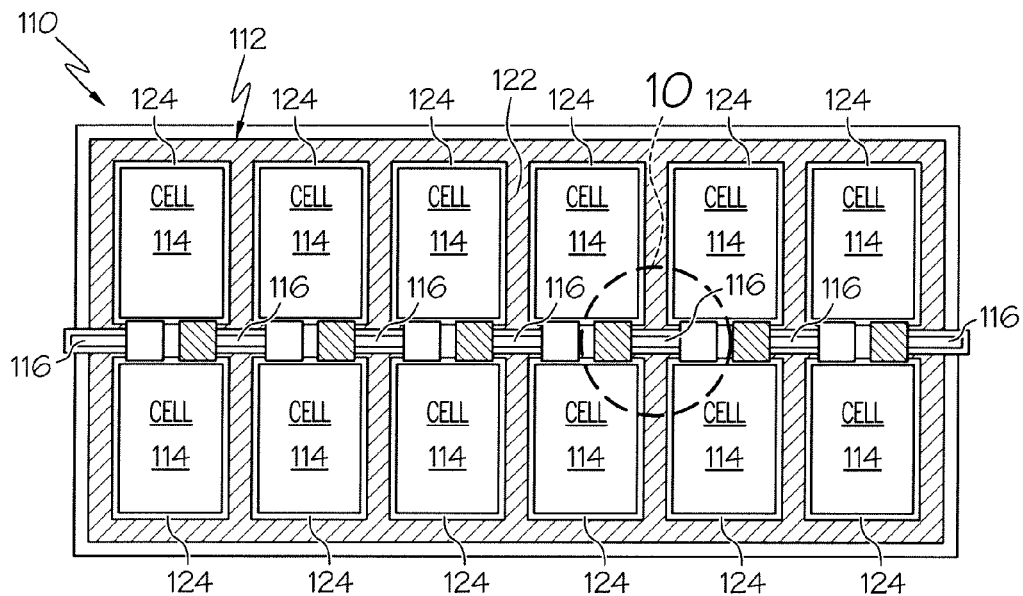
FIG. 9 is a top plan view of a cell block showing a plurality of battery cells supported by a cell retention tray and a plurality of bus bars situated along the length of the cell retention tray so that the battery cells can be connected in series and electrically coupled as a group at an end of the cell block.

Cell block 110 includes a retention tray 112, a plurality of battery cells 114, and a plurality of bus bars 116 as shown, for example in FIG. 9. Retention tray 112 is illustratively constructed from anodized aluminum for high thermal and low electrical conductivity and is configured to support plurality of battery cells 114 and bus bars 116 as shown in FIG. 9. Battery cells 114 are illustratively rechargeable electrochemical lithium cells. Bus bars 116 are coupled to each of the battery cells 114 so that plurality of battery cells 114 are connected in series.

Retention tray 112 includes a base 120 and a raised divider 122 forming pockets 124 as shown in FIGS. 2 and 9-11. Base 120 contacts battery cells 114 and transmits heat from battery cells 114 to retention tray 112. Raised divider 122 contacts either cooling plate 12 or a base 120 of another retention tray 112 thereby passing heat to the cooling plate 12 as suggested in FIG. 1.

Battery cells 114 are positioned in pockets 124 of retention tray 112 formed between raised divider 122 of retention tray 112 so that very little space if any is left between the face of the cell and the retention tray as shown, for example, in FIGS. 1 and 9-11. A small amount of thermal interface gel may be applied to the battery cells 114 to reduce or eliminate any air gap that might create thermal barriers between the battery cells 114 and the retention trays 112. In the illustrative embodiment, two by six series of battery cells 114 is utilized to achieve a desired system voltage. In other embodiments, other configurations may be used to provide different voltage outputs.

Figure 10:
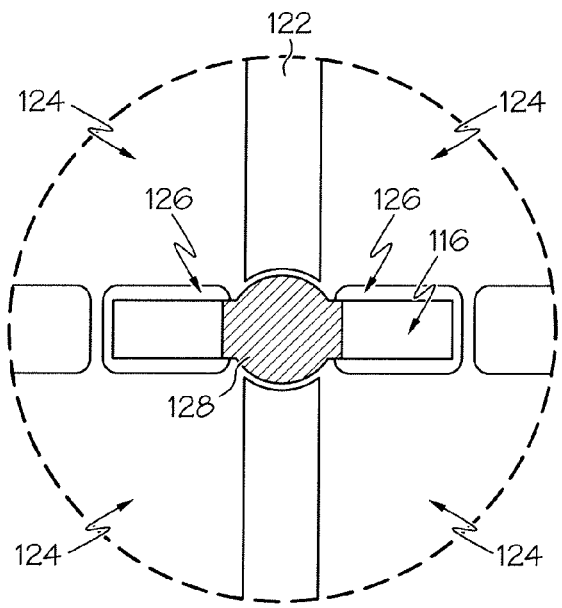
FIG. 10 is a detail view of the bus bar of FIG. 9 showing that the bus bar is electrically insulated from the cell retention tray and is accessible from above and below the cell retention tray such that welding equipment can touch top and bottom surfaces of the bus bars to form connections to the battery cells through a series of weld windows.

Bus bars 116 are coupled to the retention tray 112 as shown, for example in FIGS. 9 and 10. Bus bars 116 are electrically couples to battery cells 114 so that battery cells 114 form a series along retention tray 112. In some embodiments, bus bars 116 are made from aluminum that is anodized except at the point of connection with the battery cells 114. Bus bars 116 are accessible for welded connection to battery cells 114 on both the top and bottom surfaces of the bus bars 116 via weld windows 126 provided in retention tray 112 as shown in FIG. 10. Bus bars 116 include insulated areas 128 between connections to battery cells 114 as shown in FIG. 10. The insulated areas are illustratively heat shrunk electrical insulation.

Figure 11:
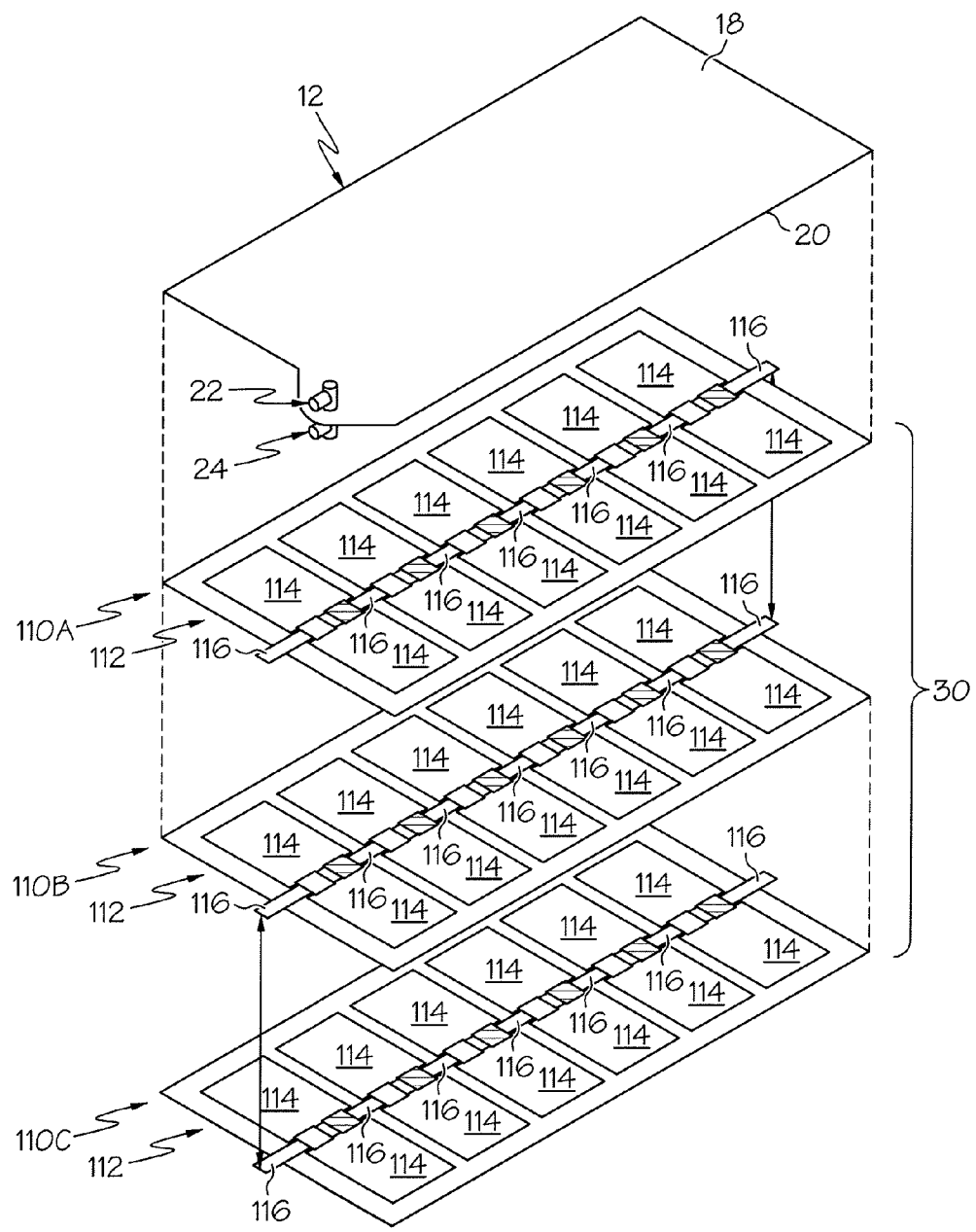
FIG. 11 is a partially exploded perspective view of a cell block and the cooling plate of FIG. 1 showing that the cell bank includes a first cell block, a second cell block, and a third cell block, the first, second, and third cell blocks electrically coupled in series.

After cell block 110 is constructed, plurality of cell blocks 30 can be assembled into bottom cell bank 16 as suggested in FIG. 11. Each cell block 110 is coupled to another cell block 110 to form a series circuit of battery cells 114 as suggested by arrows 130, 132 shown in FIG. 11.

The assembly process for this system begins by mounting bus bars 116 within retention tray 112 of a first cell block 110A. Then battery cells 114 are mounted into retention tray 112 using spray adhesive. Cell terminals are electrically connected, in some embodiments ultrasonically welded, to the bus bars 116. At least one sensor 28 is installed with sensing leads which are fastened permanently in place. Cell terminals are covered with Kapton™ tape to ensure electrical isolation from contact. Cell block 110A is then treated with thermal interface gel compound (a thin layer) on battery cell 114 faces and thermal grease on the interface tray contact areas. Cell block 110 is then mounted to the cooling plate 12.

The next step in the process is to assemble another cell block 110B including battery cells 114 as before. After thermal compounds are applied, this cell block 110B is mounted to the back of the cell block 110A previously attached. A bus bar 116 of the second cell block is connected using a threaded fastener to the bus bar 116 of the first cell block 110A at one end only as suggested in FIG. 11. Next, a third cell block 110C is built up in the same way and mounted to the back of the second cell block 110B. The electrical bus of cell block 110C is connected to the bus bar 116 of the second cell block 110B at the opposite end from the previous layer in order to continue the series electrical connection as suggested in FIG. 11.

At this point, the unit is half complete and threaded fasteners (not shown) are installed to hold the cell blocks 110A, 110B, 110C to the cooling plate 12 before turning the battery pack apparatus 10 over. The process of attaching a plurality of cell blocks 30 to this second side of the cold plate is a repeat of the process of the first side. With each added cell block 110, the bus structure is connected to the previous cell block 110 in such a way as to continue a serial electrical connection of battery cell pairs.

Once all three cell blocks 110 included in cell bank 16 are attached in piggyback fashion to the second side of the cooling plate 12, then threaded fasteners (not shown) are installed to hold them in place. Next, in some embodiments (not shown), layers of top and bottom insulation/structure are placed on the large outer surfaces and multiple straps are attached, encircling the assembly, to hold the layers tightly together.

An alternative assembly method exists which is to start with the outermost (bottom) cell block 110 and build the entire assembly from the bottom upwards. This technique includes the benefit of eliminating the step of turning the assembly over halfway through the assembly process.

Although certain illustrative embodiments have been described in detail above, many embodiments, variations and modifications are possible that are still within the scope and spirit of this disclosure as described herein and as defined in the following claims.

What is claimed is:

1. A battery pack apparatus comprising
a first cell bank including a first tray and at least one first battery cell coupled to the first tray,
a second cell bank including a second tray and at least one second battery cell coupled to the second tray, and
a laminated cooling plate in contact with the first cell bank and the second cell bank such that the laminated cooling plate is situated in between the first cell bank and the second cell bank, the laminated cooling plate including a plurality of face sheets forming a fluid inlet and a fluid outlet and a plurality of internal sheets stacked together and each forming a plurality of fluid passages connecting the fluid inlet to the fluid outlet, the internal sheets formed to include fluid pathways each defined through a thickness of the respective internal sheet and collectively defining the fluid passages, wherein each internal sheet includes a number of interruptions arranged along the fluid pathways such that none of the fluid pathways individually form an uninterrupted flow path along the respective internal sheet, wherein the fluid inlet is located on one side of the laminated cooling plate and the fluid outlet is located on an opposite second side of the laminated cooling plate,
wherein each fluid pathway forms an S-shape circuit, the S-shape circuits formed in each internal sheet are substantially similar to the S-shape circuits formed in the other internal sheets, and the S-shape circuits of each internal sheet are aligned with corresponding S-shape circuits of the other internal sheets to form S-shaped channels that extend between the plurality of face sheets, none of the interruptions on each internal sheet is aligned with the interruptions on the other internal sheets, such that fluid flows around the interruptions in the fluid passages.

2. The battery pack apparatus of claim 1, wherein each of the fluid passages provides an independent flow path between the fluid inlet and the fluid outlet.

3. The battery pack apparatus of claim 2, wherein the plurality of face sheets includes a top face sheet formed to include an external inlet hole and a bottom face sheet formed to include an external outlet hole.

4. The battery pack apparatus of claim 2, wherein a substantially similar pressure drop is produced along each of the plurality of fluid passages.

5. The battery pack apparatus of claim 2, wherein the plurality of internal sheets includes a first internal sheet formed to include an internal inlet hole and a first plurality of fluid pathways extending through the first internal sheet.

6. The battery pack apparatus of claim 5, wherein the plurality of internal sheets includes a second internal sheet formed to include a second plurality of fluid pathways extending through the second internal sheet.

7. The battery pack apparatus of claim 6, wherein the plurality of internal sheets includes a third internal sheet formed to include an internal outlet hole and a third plurality of fluid pathways extending through the third internal sheet.

8. The battery pack apparatus of claim 7, wherein the first internal sheet includes a first interruption of the number of interruptions blocking the first plurality of fluid pathways at a point, the second internal sheet includes a second interruption of the number of interruptions blocking the second plurality of fluid pathways at a point, and the third internal sheet includes a third interruption of the number of interruptions blocking the third plurality of fluid pathways at a point.

9. The battery pack apparatus of claim 8, wherein the first interruption, the second interruption, and the third interruption are spaced apart from one another.

10. The battery pack apparatus of claim 1, wherein the fluid inlet and the fluid outlet are separated by a solid portion of at least one of the internal sheets.

11. The battery pack apparatus of claim 10, wherein each of the plurality of fluid flow passages provides an independent flow path between the fluid inlet and the fluid outlet.

12. The battery pack apparatus of claim 11, wherein the plurality of internal sheets includes a first internal sheet formed to include an internal inlet hole and a first plurality of fluid pathways extending through the first internal sheet.

13. The battery pack apparatus of claim 12, wherein the plurality of internal sheets includes a second internal sheet formed to include a second plurality of fluid pathways extending through the second internal sheet.

14. The battery pack apparatus of claim 13, wherein the plurality of internal sheets includes a third internal sheet formed to include an internal outlet hole and a third plurality of fluid pathways extending through the third internal sheet.

15. The battery pack apparatus of claim 14, wherein the first internal sheet, the second internal sheet, and the third internal sheet are indexed relative to one another and brazed together so that the first plurality of pathways, the second plurality of pathways, and the third plurality of pathways cooperate to define the plurality of fluid flow passageways connecting the fluid flow inlet and the fluid flow outlet.

16. The battery pack apparatus of claim 1, wherein each of the S-shaped circuits connects the fluid inlet to the fluid outlet.

17. The battery pack apparatus of claim 16, wherein each of the plurality of fluid passages independently connects the fluid inlet to the fluid outlet.

18. The battery pack apparatus of claim 16, wherein each of the plurality of fluid passages is interdigitally coupled to the fluid inlet and the fluid outlet.

19. The battery pack apparatus of claim 18, wherein the fluid inlet and the fluid outlet are aligned so that the fluid outlet lies in a footprint of the fluid inlet when viewing the top surface of the laminate cooling plate.

20. The battery pack apparatus of claim 16, wherein each of the plurality of passages is substantially the same length and each of the plurality of passages has an equal number of turns.

21. The battery pack apparatus of claim 16, wherein each of the plurality of internal sheets is formed to include a plurality of pathways and the plurality of pathways of each of the plurality of internal sheets cooperate with the plurality of pathways of the other internal sheets to define the plurality of passageways.

22. A battery pack apparatus comprising
- a first cell bank including a first tray and at least one first battery cell coupled to the first tray,
- a second cell bank including a second tray and at least one second battery cell coupled to the second tray, and
- a laminated cooling plate arranged between and in contact the first cell bank and the second cell bank, the laminated cooling plate including a plurality of face sheets forming a fluid inlet and a fluid outlet and a plurality of internal sheets stacked together and each having a plurality of pathways defined through a thickness of the respective internal sheet,
- wherein the pathways of each of the internal sheets cooperate with the pathways of the other internal sheets to define a plurality of passageways to fluidly connect the fluid inlet to the fluid outlet,
- wherein the pathways of each of the internal sheets form an S-shape pattern corresponding to, substantially similar to, and aligned with the pattern of the pathways of the other internal sheets, wherein each of the internal sheets includes interruptions arranged at locations within their respective pattern to block their respective fluid pathways and provide structural support, and
- wherein the locations of the interruptions of each of the internal sheets are spaced apart along their respective patterns from the locations of the interruptions of the others of the internal sheets so that the locations do not correspond when the internal sheets are stacked together, such that fluid flows around the interruptions in the fluid passages.

23. The battery pack apparatus of claim 22, wherein each of the pathways is substantially the same length and each of the plurality of pathways has an equal number of turns.

* * * * *